United States Patent [19]

Kuo

[11] Patent Number: 5,256,758
[45] Date of Patent: Oct. 26, 1993

[54] THERMOSETTING COATING COMPOSITIONS

[75] Inventor: Thauming Kuo, Kingsport, Tenn.

[73] Assignee: Eastman Kodak Company, Rochester, N.Y.

[21] Appl. No.: 883,509

[22] Filed: May 15, 1992

Related U.S. Application Data

[63] Continuation-in-part of Ser. No. 712,380, Jun. 10, 1991, abandoned.

[51] Int. Cl.$^5$ .............................................. C08G 63/00
[52] U.S. Cl. ................................. 528/176; 528/100; 528/190; 528/192; 528/194; 524/601
[58] Field of Search ............... 528/176, 190, 192, 194, 528/100; 524/601

[56] References Cited

U.S. PATENT DOCUMENTS

| | | | |
|---|---|---|---|
| 2,993,873 | 7/1961 | Heinrich et al. | 260/22 |
| 3,836,491 | 9/1974 | Taft et al. | 260/22 |
| 4,189,421 | 2/1980 | Shay et al. | 260/38 |
| 4,267,239 | 5/1981 | Thankachan et al. | 428/425.1 |
| 4,298,658 | 11/1981 | Thankachan et al. | 428/425.1 |
| 4,331,782 | 5/1982 | Linden | 525/173 |
| 4,331,783 | 5/1982 | Stoy | 525/294 |
| 4,340,718 | 7/1982 | Zannucci et al. | 528/128 |
| 4,343,839 | 8/1982 | Blegen | 427/340 |
| 4,355,133 | 10/1982 | East et al. | |
| 4,405,764 | 9/1983 | Tobias et al. | 525/443 |
| 5,043,192 | 8/1991 | Jones et al. | 428/1 |

FOREIGN PATENT DOCUMENTS

| | | |
|---|---|---|
| 0034919 | 9/1981 | European Pat. Off. |
| 0419088A1 | 3/1991 | European Pat. Off. |
| 2266725 | 10/1975 | France |
| 50-040629A | 4/1975 | Japan |
| 51-044130A | 4/1976 | Japan |
| 51-056839A | 5/1976 | Japan |
| 52-073929 | 6/1977 | Japan |

OTHER PUBLICATIONS

Patent Abstracts of Japan, vol. 14, No. 232 (C-719) (4175) May 17, 1990 & JP,A,25 8 559 (Hitachi Chem. Co. Ltd.) Feb. 27, 1990 (abstract).

Derwent Publications Ltd., London, GB; AN 90-103274 & JP,A, 2 053 881 (Towa Kasei Kogyo) Feb. 22, 1990 (abstract).

*Primary Examiner*—John Kight, III
*Assistant Examiner*—Duc Truong
*Attorney, Agent, or Firm*—Bernard J. Graves, Jr.; William P. Heath, Jr.

[57] ABSTRACT

Provided are novel phenolic functional polyesters which are prepared by a direct polycondensation process. The polyesters formed therefrom are useful in enamel compositions and upon curing provide coatings which exhibit superior hardness, impact resistance and acid resistance heretofore unachievable with other polyester-based coatings.

30 Claims, No Drawings

THERMOSETTING COATING COMPOSITIONS

CROSS-REFERENCE TO RELATED APPLICATION

This application is a continuation in part of U.S. Ser. No. 07/712,380, filed Jun. 10, 1991, now abandoned, incorporated herein by reference.

FIELD OF THE INVENTION

This invention belongs to the field of polymer chemistry. More particularly, this invention relates to acid resistant polyester coatings.

BACKGROUND OF THE INVENTION

There is a need in the coatings industry for high strength, high modulus, chemically resistant coatings. For high modulus, the coatings must exhibit exceptional hardness, while for high strength, they must have good resistance to impact. As to chemical resistance, it is particularly desirable for automotive coatings to have excellent acid etch resistance. This invention is directed toward the above objective. Crosslinkable polyester coatings resins are synthesized and formulated into industrial baking enamels from which surface coatings can be obtained, the cured films exhibiting a unique combination of hardness (pencil hardness >4H) and impact resistance (160 lb-in) as well as exceptionally high acid etch resistance.

It has been demonstrated that thermotropic liquid crystal polymers (LCPs) possess many advantages over conventional thermoplastics. The self reinforcement of the ordered polymeric molecules in the liquid crystalline (LC) state generally yield thermoplastics with exceptionally high strength and high modulus. In addition, LCPs have also been shown to have excellent solvent resistance, chemical resistance (e.g., acid, base, detergent), and weatherability. As described above, these properties are highly desirable in surface coatings. Recently coating scientists have attempted to apply the LCP technology to the coatings art.

U.S. Pat. No. 5,043,192 (Jones) discloses the application of liquid crystalline polyesters to the coatings industry, while displaying high hardness and high impact resistance. In one of the examples, linear oligoester diols were prepared and modified with p-hydroxybenzoic acid (PHBA) to yield LC oligoesters. The PHBA\diol mole ratio varied from 2.1/1 to 13/1. It was suggested that the excess of PHBA formed repeating p-oxybenzoyl LC segments in the oligoester chain ends. The resulting resins, however, were highly colored (i.e., brownish). The use of large quantities of the expensive raw material, PHBA, also made the resins commercially impractical.

European Patent Application No. 419088 discloses non liquid crystalline esterphenol capped liquid polymer and polyol compositions in combination with an amino crosslinking agent which provided films having superior properties. The resins were prepared by following a procedure similar to that of Jones at a lower reaction temperature (i.e., <200° C.) A PHBA\aliphatic hydroxyl equivalent ratio of 1/1 was used mostly, although it was suggested the ratio could be ranged from about 0.05 to about 1.25. This reference teaches that the coatings showed improved hardness and impact resistance. However, by repeating their examples we found the coatings did not exhibit high acid resistance.

Curable resin compositions modified with hydroxybenzoic acid had also been reported by others. U.S. Pat. No. 2,993,873 disclosed that drying times and coating properties of oil modified alkyd resins could be improved by replacing part of unsaturated fatty acids with hydroxybenzoic acid in the resin formulations. The coatings were cured by air dry or baking without the presence of a crosslinking agent. U.S. Pat. Nos. 4,267,239 and 4,298,658 describe the modification of alkyd resins with PHBA. The resulting resins could be rapidly cured at ambient temperatures with isocyanates in the presence of a tertiary amine vapor. U.S. Pat. Nos. 4,343,839 and 3,836,491 disclose a coating composition which is rapidly curable at room temperature in the presence of a tertiary amine catalyst vapor. The coating compositions were phenolic terminated polyesters and multi isocyanate curing agents. U.S. Pat. No. 4,331,7823 discloses the improved synthesis of a phenol functional polyester polymer which utilizes a preformed adduct of a hydroxybenzoic acid and an epoxy compound. Japanese patents No. 7540,629, 76 56,839, 76 44,130, and 787 73,929 disclose powder coating compositions containing phenolic hydroxy end groups. These resins had high softening points and were applied to the surface as powders.

In an effort to raise the softening point of the melamine type crosslinking agent for powder coatings, U.S. Pat. No. 4,189,421 taught the synthesis of solid addition products having a softening point above 100° F. by the reaction of a monohydroxy, single ring aromatic compound and a hexakis(alkoxymethyl)amino triazine ring (e.g., hexamethoxymethylmelamine, HMMM). They found the phenol compound not only could react with HMMM to form ether linkages (O-alkylation), but it could also form methylene bridges at the phenol ortho or para position (C-alkylation). The extent of both reactions was essentially equal. Further ring closure of the resulting product could also have occurred.

In the present invention, a smaller amount of PHBA was incorporated into the resins (i.e., about 15-16 mole %) to provide phenolic functionalities. Unlike the procedures described in both Jones' and Yezrlilev's examples, no organic solvent was used for the synthesis of the resin. This feature allows the resins to be used in waterborne coating compositions. Further, this process is suitable for economical industrial production. In addition, we have discovered that terephthalic acid (TPA) affords coatings with better acid resistance than isophthalic acid (IPA). Accordingly, TPA was also employed in the resin formulations. A branching agent, trimethylolpropane(TMP), was also incorporated into the resins which provided higher crosslink density. Further, I have discovered that the presence of TMP, a trifunctional compound, is required in order to yield higher molecular weight resins containing PHBA. Because the phenolic groups are not reactive under the conditions employed for resin synthesis, PHBA should be viewed as a monofunctional monomer which could terminate the polymer chain growth. I found that a triol such as TMP helps to propagate the growth of the polymer chain and affords surprisingly higher molecular weight resins; the coatings made possible by this discovery have strikingly better properties. This effect was found to be especially significant when PHBA was reacted with an excess of TMP only in the first stage of the resin synthesis as described below in Example 15. In this example, the carboxyl group of PHBA was capped by TMP to form a diol adduct in the first stage. The diol adduct was then polymerized with other diols and diacids in the second stage without causing the problem of decarboxylation of PHBA. The resulting resin had a number average molecular weight of 3200 which was much higher than other resins containing a similar ratio of PHBA. Finally, attempts at end capping the reins with PHBA in the final stage of the reaction were unsuccessful in providing resins with higher molecular weight-these attempts resulted in significant PHBA sublimation as well as degradation of the polymer chain due ostensibly to ester interchange reactions.

As described in the Experimental Section below, the mole ratios of the resin compositions were adjusted as necessary to afford coatings having the highest pencil hardness while still retaining the best impact resistance. The coatings also exhibited exceptionally high acid resistance in addition to other desirable properties.

SUMMARY OF THE INVENTION

The present invention provides oil free polyester resin compositions containing phenolic functional groups which are prepared by a direct polycondensation process which is suitable for economical, large sale production. The phenolic functional resins thus produced are useful as coatings binders and thus may be dissolved in conventional solvents and formulated into thermosetting coating compositions which exhibit an extraordinary combination of pencil hardness and impact resistance as well as acid resistance. As noted below, substantially all of the hydroxy acid residues exist at the ends of the curable polyester chain, i.e., >90%. As used herein, the term "acid resistance" is intended to mean coatings which show very little degradative effect after exposure to 50% $H_2SO_4$ for 24 hours and whose free-standing films do not decompose in concentrated $H_2SO_4$ over a period of at least 30 minutes. Accordingly, these coatings compositions are especially useful for applications where extreme environmental impact may be expected, e.g., automobile body exteriors.

DETAILED DESCRIPTION OF THE INVENTION

The present invention provides an enamel composition which when applied to a substrate and cured provides a coating having a pencil hardness of greater than 4H, an impact resistance of greater than 140 lb.-in., and being substantially resistant to acidic corrosion, said composition comprising (I) about 25 to about 65 weight percent of a curable polyester having a number average molecular weight of about 800 to about 3500 and a weight average molecular weight of about 3000 to about 70,000, comprising
  (a) about 35 to 45 mole percent of diol residues, based on the total moles of (a), (b), (c), (d), (e), and (f);
  (b) about 4 to about 8 mole percent of triol residues, based on the total moles of (a), (b), (c), (d), (e), and (f);
  (c) about 5 to about 18 mole percent, based on the total moles of (a), (b), (c), (d), (e), and (f), of residues of an aliphatic diacid.
  (d) about 0 to about 30 mole percent of aromatic dicarboxylic acid residues based on the total moles of (a), (b), (c), (d), (e), and (f);
  (e) about 5 to about 35 mole percent of terephthalic acid residues based on the total moles of (a), (b), (d), (d), (e), and (f);
  (f) about 12 to about 20 mole percent, based on the total moles of (a), (b), (c), (d) (e), and (f) of hydroxy acid residues selected from residues of

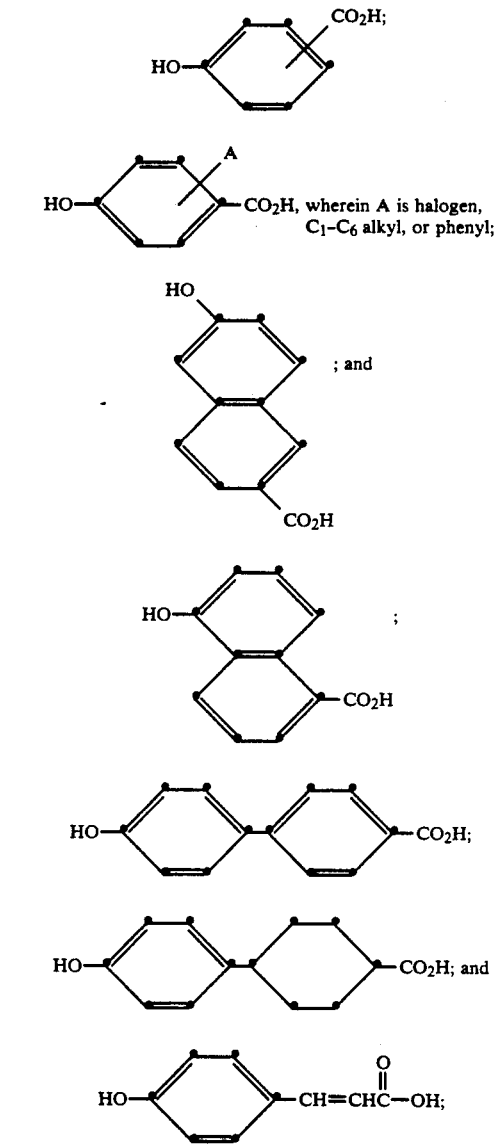

wherein substantially all of said hydroxy acid residues are at the ends of said curable polyester;
(II) about 5 to about 20 weight percent of an amino crosslinking agent; based on the total weight of (I), (II), and (III);
(III) about 30 to about 70 weight percent of an organic solvent, based on the total weight of (I), (II), and (III), the total being 100 percent.

As a preferred embodiment of this aspect of the invention, there is provided an enamel composition which when applied to a substrate and cured provides a coating having a pencil hardness of greater than 4H, an impact resistance of greater than 140 lb.-in., and being substantially resistant to acidic corrosion, said composition comprising (I) about 25 to about 65 weight percent of a curable polyester having a number average molecular weight of about 800 to about 3500 and a weight average molecular weight of about 3000 to about 70,000, comprising
(a) about 38 to 42 mole percent of diol residues, based on the total moles of (a), (b), (c), (d), and (e);
(b) about 5 to about 7 mole percent of triol residues, based on the total moles of (a), (b), (c), (d), and (e);
(c) about 6 to about 10 mole percent, based on the total moles of (a), (b), (c), (d), and (e) of an aliphatic diacid;
(d) about 28 to about 32 mole percent of terephthalic acid residues based on the total moles of (a), (b), (c), (d), and (e);
(e) about 14 to about 16 mole percent, based on the total moles of (a), (b), (c), (d) and (e), of a hydroxy acid residue of the formula

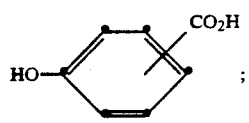

wherein substantially all of said hydroxy acid residues are at the ends of said curable polyester;
(II) about 5 to about 20 weight percent of an amino crosslinking agent; based on the total weight of (I), (II), and (III);
(III) about 30 to about 70 weight percent of an organic solvent, based on the total weight of (I), (II), and (III), the total being 100 percent.

As a further preferred embodiment of the present invention, there is provided an enamel composition which when applied to a substrate and cured provides a coating having a pencil hardness of greater than 4H, an impact resistance of greater than 140 lb.-in., and being substantially resistant to acidic corrosion, said composition comprising
(I) about 25 to about 65 weight percent of a curable polyester having a number average molecular weight of about 800 to about 3500 and a weight average molecular weight of about 3000 to about 70,000, comprising
(a) about 38 to 42 mole percent of diol residues, based on the total moles of (a), (b), (c), (d), (e), and (f);
(b) about 5 to about 7 mole percent of triol residues, based on the total moles of (a), (b), (c), (d), (e), and (f);
(c) about 6 to about 10 mole percent, based on the total moles of (a), (b), (c), (d), (e), and (f), of an aliphatic diacid;
(d) about 13 to about 17 mole percent of aromatic dicarboxylic acid residues, based on the total moles of (a), (b), (c), (d), (e), and (f);
(e) about 13 to about 32 mole percent of terephthalic acid residues based on the total moles of (a), (b), (c), (d), (e), and (f);
(f) about 14 to about 16 mole percent, based on the total moles of (a), (b), (c), (d) (e), and (f), of a hydroxy acid residue of the formula

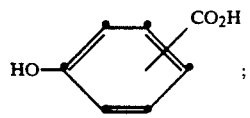

wherein substantially all of said hydroxy acid residues are at the ends of said curable polyester;
(II) about 5 to about 20 weight percent of an amino crosslinking agent; based on the total weight of (I), (II), and (III);
(III) about 30 to about 70 weight percent of an organic solvent, based on the total weight of (I), (II), and (III), the total being 100 percent.

In a further embodiment of the present invention, there is provided the above curable polyesters. Especially preferred curable polyesters have as component (a), residues of neopentyl glycol; as component (b), residues of trimethylolpropane; as component (c), residues of adipic acid; as component (d), residues of isophthalic acid; and as component (f), residues of p hydroxybenzoic acid.

In the preparation of the curable polyesters of the present invention, it is preferred that the reactants be combined neat, and heated to a temperature of about 175° C. to about 230° C. Typical reaction times range from 5 hrs to about 20 hrs. The reaction generally requires the use of a steam heated partial condenser to remove the condensate, water and/or alcohol, and at the same time condense back the volatile reactants.

The reaction is preferably carried out under the constant flow of nitrogen gas.

As a further aspect of the present invention, there is a process for preparing a curable polyester having a number average molecular weight of about 800 to about 3500 and a weight average molecular weight of about 3000 to about 70,000, comprising
(a) about 35 to 45 mole percent of diol residues, based on the total moles of (a), (b), (c), (d), (e), and (f);
(b) about 4 to about 8 mole percent of triol residues, based on the total moles of (a), (b), (c), (d), (e), and (f);
(c) about 5 to about 18 mole percent, based on the total moles of (a), (b), (c), (d), (e), and (f), of residues of an aliphatic diacid;
(d) about 0 to about 30 mole percent of aromatic dicarboxylic acid residues based on the total moles of (a), (b), (c), (d), (e), and (f);
(e) about 5 to about 35 mole percent of terephthalic acid residues based on the total moles of (a), (b), (c), (d), (e), and (f);
(f) about 12 to about 20 mole percent, based on the total moles of (a), (b), (c), (d) (e), and (f) of hydroxy acid residues of residues of the formula

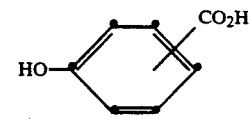

wherein substantially all of said hydroxy acid residues are at the ends of said curable polyester;
which comprises combining component (b) triol with component (f) in the presence of a condensation catalyst, followed by heating to a temperature sufficient to induce condensation, followed by addition of components (a), (d), (e) and optionally (c), followed by continued heating until said condensation is substantially complete.

Preferred triols include trimethylolpropane, trimethylolethane, glycerol, and the like. Trimethylolpropane is the most highly preferred triol.

Preferably the aliphatic and aromatic dicarboxylic acid residues of the curable polyesters are selected from residues of oxalic; malonic, dimethylmalonic; succinic; glutaric; adipic; trimethyladipic; pimelic, 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexane dicarboxylic; phthalic; terephthalic; isophthalic; 2,5-norbornanedicarboxylic; 1,4-naphthalic; diphenic; 4,4'-oxydibenzoic, diglycolic, thiodipropionic; 4,4'-oxydibenzoic, diglycolic, thiodipropionic; 4,4'-sulfonyldibenzoic; 4,4'-diphenyldicarboxylic, and 2,6-naphthalenedicarboxylic acids.

The curable polyesters provided herein preferably have an acid number of not greater than 80 and a hydroxyl number of at least 50.

It should be appreciated that lower alkyl, i.e., $C_1$–$C_6$ alkyl, esters can be utilized in the above direct polycondensation, and in such an instance, the by-product of the condensation will be a lower ($C_1$–$C_6$) alcohol.

Component (d) above can be chosen from a wide variety of hydroxy acids. Examples of preferred monomers and include:

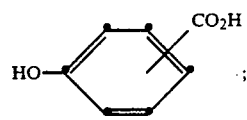

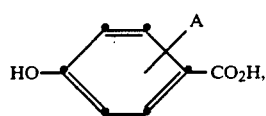

wherein A is halogen, $C_1$–$C_6$ alkyl, or phenyl;

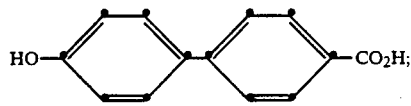

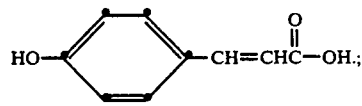

The curable polyesters provided by the process above are useful as binders in thermosetting coating compositions.

It will be appreciated, of course, that in the above description and as described below, the various mole and weight percentages in the enamel compositions and curable polyesters will always total 100 percent.

As a further aspect of the present invention, there is provided a water borne enamel composition, which is produced by modifying the above curable polyesters with a polybasic acid in order to increase the acid number above 40. The resulting modified polyester is then neutralized with an amine and dispersed in water. The water-borne compositions are further described below in the Experimental Section.

Suitable solvents for the curable enamel composition include xylenes, cyclohexanone, ketones, (for example, methyl amyl ketone), 2 butoxyethanol, ethyl-3-ethoxypropionate, toluene, n butanol, and other volatile inert solvents typically used in industrial baking (i.e., thermosetting) enamels.

The cross-linking agent is preferably a melamineformaldehyde type cross linking agent, i.e., a cross-linking agent having a plurality of —$N(CH_2OR^3)_2$ functional groups, wherein $R^3$ is $C_1$–$C_4$ alkyl, preferably methyl.

In general, the cross linking agent may be selected from compounds of the following formulae, wherein $R^3$ is independently $C_1$–$C_4$ alkyl:

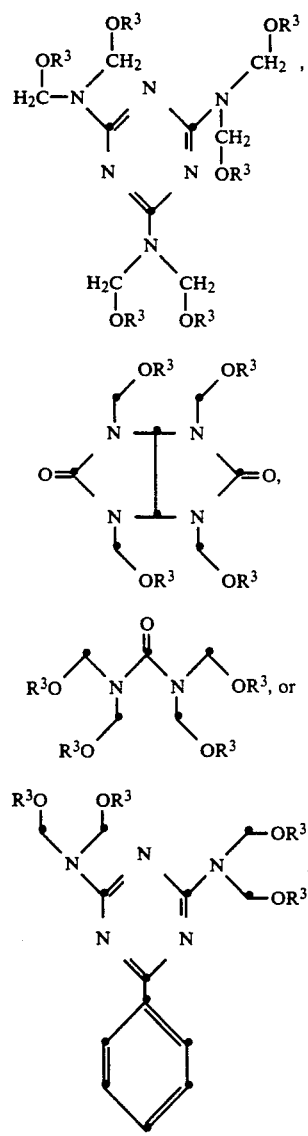

In this regard, preferred cross-linking agents include hexamethoxymethylmelamine, tetramethoxymethylbenzoguanamine, tetramethoxymethylurea, mixed butoxy/methoxy substituted melamines, and the like.

The most preferred cross-linking agent is hexamethoxymethylmelamine.

As a further aspect of the present invention, there is provided a curable enamel composition further comprising one or more cross-linking catalysts. The most preferred cross-linking catalyst for melamine type cross-linking agents is p-toluenesulfonic acid.

As a further aspect of the present invention there is provided a cross linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti settling, anti sag and bodying agents; anti-skinning agents; anti flooding and anti-floating agents; fungicides and mildewicides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W.R. Grace & Company under the trademark SYLOID ®; polypropylene, available from Hercules Inc., under the trademark HERCOFLAT ®; synthetic silicate, available from J.M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso decyl sulfosuccinnate, disodium ethoxylated alcohol half ester of sulfosuccinnic acid, disodium alkyl amido polyethoxy sulfosuccinnate, tetrasodium N-(1,2-dicarboxy-ethyl)-N-oxtadecyl sulfosuccinnamate, disodium N octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRU-BREAK of Buckman Laboratories Inc., under the BYK ® trademark of BYK Chemie, U.S.A., under the FOAMASTER ® and NOPCO ® trademarks of Henkel Corp./Coating Chemicals, under the DREW-PLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4 dimethyloxazolidine, 3,4,4-trimethyloxazolidine, midified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the tradename Tinuvin, and diethyl-3-acetyl-4-hydroxy-benzyl-phosphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above described additives, further comprising one or more pigments.

Pigments suitable for use in the enamel compositions envisioned by the present invention are the typical organic and inorganic pigments, well known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI Pigment Red 57:1.

Upon formulation above, the curable enamel composition is then applied to the desired substrate or article, e.g., steel, aluminum, or galvanized sheeting (either primed or unprimed), heated (i.e., cured) to a temperature of about 140° C. to about 175° C., for a time period of 5–60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

Experimental Section

All of the curable polyester resins were formulated to be hydroxyl terminated. In addition to the free aliphatic hydroxyl groups, the resins also contained phenolic hydroxyl end groups. Acid numbers could not be correctly determined by ASTM Method D465, because of the presence of acidic phenolic end groups. A potentiometric titration method was used to determine the acid number and phenolic hydroxyl number of resins 7–11. Molecular weights were estimated by Gel Permeation Chromatography and viscosities were measured by an ICI Cone and Plate Viscometer at 150° C. The thermotransition temperatures were recorded on a Differential Scanning Calorimeter (DSC).

In the following examples, either methyl 4-hydroxybenzoate (MHB) or p hydroxybenzoic acid (PHBA) was incorporated into the resins to provide phenolic functionality. MHB is more soluble and is therefore more suitable for the reaction, but it is more expensive than PHBA. Because phenolic ester groups are highly labile under the reaction condition of resin synthesis, it was evidenced from NMR spectra and potentiometric titration data that little or none of the phenolic groups were reacted to form ester linkages. As a result, the resins were not liquid crystalline.

In order to evaluate the effects of the amount of MHB on the coating properties, various mole ratios (i.e., about 16%, 27%, 35%, and 41%) of MHB Were used to synthesize the resins. It was found that clear, soluble resins could be prepared from all of the reactions; however, when higher mole ratios (35% and 41%) of MHB were employed, the coatings became brittle as indicated by the poor impact resistance (e.g., <40 lb.-in). Example 1 and 2 show the synthesis of resins with 16% and 27% of MHB, respectively.

Example 1 - Preparation of Resin 1

To a three neck round bottom flask equipped with a mechanical stirrer, a steam partial condenser, a Dean-Stark trap and a water condenser were charged the following reactants: NPG 202.98 g (1.95 mole), TMP 45.42 g (0.34 mole), AD 122.58 g (0.84 mole), TPA 199.20 g (1.20 mole), MHB 121.68 g (0.80 mole), and the catalyst, Fascat 4100 0.5 g. The mixture was heated to 150° C. and stirred under $N_2$ atmosphere. The temperature was then gradually increased to 220° C. in a period of 5 hrs and the distillate (clear water and methanol) was collected in the Dean Stark trap. After stirring for eight more hours, the resulting viscous resin was collected in a metal container and cooled to room temperature.

Example 2 - Preparation of Resin 2

To a three neck round bottom flask equipped with a mechanical stirrer, a steam partial condenser, a Dean-Stark trap and a water condenser were charged the following reactants: NPG 202.98 g (1.95 mole), TMP 45.42 g (0.34 mole), AD 122.58 g (0.84 mole), TPA 199.20 g (1.20 mole). MHB 243.36 g (1.60 mole), and the catalyst, Fascat 4100 0.5 g. The mixture was heated to 150° C. and stirred under $N_2$ atmosphere. The temperature was then gradually increased to 220° C. in a period of 4.5 hr and the distillate (clear water and methanol) was collected in the Dean Stark trap. After stirring for ten more hours, the resulting viscous resin was collected in a metal container and cooled to rt.

p-Hydroxybenzoic acid (PHBA) is a more common polymer intermediate used in the industry than MHB. Consequently the possibility of using PHBA instead of MHB as the raw material was investigated. It was found that satisfactory results could be obtained when 15 mole % of PHBA was used in the reaction although the reaction time was longer. Nevertheless, when the mole ratio of PHBA was increased to 27%, the reaction mixture turned green; presumably caused by the decomposition of PHBA.

Example 3 - Preparation of Resin 3

To a three neck round bottom flask equipped with a mechanical stirrer, a steam partial condenser, a Dean-Stark trap and a water condenser were charged the following reactants: NPG 212.98 g (2.05 mole), TMP 45.42 g (0.34 mole), AD 122.58 g (0.84 mole), TPA 199.20 g (1.20 mole), PHBA 110.46 g (0.80 mole), and the catalyst, Fascat 4100 0.5 g. The mixture was heated to 150° C. and stirred under $N_2$ atmosphere. The temperature was then gradually increased to 220° C. in a period of 3.5 hr and the distillate (clear water) was collected in the Dean Stark trap. After stirring for eleven more hours, the resulting viscous resin was collected in a metal container and cooled to rt.

2-Butyl-2-ethyl-1,3-propanediol (BEPD) is an analogue of NPG glycol with butyl and ethyl side groups. The long alkyl side groups presumably can increase the flexibility of polymers. Thus a resin was prepared by substitution of BEPD for NPG and their properties were compared.

Example 4 - Preparation of Resin 4

To a three neck round bottom flask equipped with a mechanical stirrer, a steam partial condenser, a Dean-Stark trap and a water condenser were charged the following reactants: BEPD 110.10 g (0.69 mole), TMP 15.14 q (0.11 mole), AD 40.86 g (0.28 mole), TPA 66.40 g (0.40 mole), MHB 40.56 g (0.27 mole), and the catalyst, Fascat 4100 0.25 g. The mixture was heated to 150° C. and stirred under $N_2$ atmosphere. The temperature was then gradually increased to 220° C. in a period of three hours and the distillate (clear water and methanol) was collected in the Dean Stark trap. After stirring for seven more hours, the resulting viscous resin was collected in a metal container and cooled to rt.

In order to evaluate the effect of $t_g$ on the coatings properties, a harder resin was prepared by replacing half amounts of adipic acid in the formulation of Example 1 with TPA. The resulting resin has a higher $t_g$ (25° C.), and the coating is harder (pencil hardness, 5H-6H), while still having the same impact resistance (160 in-lb).

Example 5 - Preparation of Resin 5

To a three neck round bottom flask equipped with a mechanical stirrer, a steam partial condenser, a Dean-Stark trap and a water condenser were charged the following reactants: NPG 45.60 g (0.39 mole), TMP 9.08 g (0.07 mole), AD 12.26 g (0.08 mole), TPA 53.78 g (0.32 mole), MHB 24.34 g (0.16 mole), and the catalyst, Fascat 4100 0.25 g. The mixture was heated to 150° C. and stirred under $N_2$ atmosphere. The temperature was then gradually increased to 220° C. in a period of 0.5 hr and the distillate (clear water and methanol) was collected in the Dean Stark trap. After stirring for 4.5 more hours, the resulting viscous resin was collected in a metal container and cooled to rt.

In an effort to optimize the coating properties, the formulation in Example 5 was modified by increasing the equivalent ratio of TPA from 67% to 73% (based on acids). As a result, the resin is harder with a $t_g$ at 27° C., and the coating has a pencil hardness of 6H with the retention of good impact resistance.

Example 6 - Preparation of Resin 6

To a three neck round bottom flask equipped with a mechanical stirrer, a steam partial condenser, a Dean-Stark trap and a water condenser were charged the following reactants: NPG 60.89 g (0.59 mole), TMP 9.08 g (0.07 mole), AD 12.26 g (0.08 mole), TPA 73.70 g (0.44 mole), MHB 24.34 g (0.16 mole), and the catalyst, Fascat 4100 0.25 g. The mixture was heated to 150°

C. and stirred under $N_2$ atmosphere. The temperature was then gradually increased to 220° C. in a period of 40 min and the distillate (clear water and methanol) was collected in a Dean Stark trap. After stirring for 3.5 more hours, the resulting viscous resin was collected in a metal container and cooled to rt.

The properties of resins 1-6 are shown in Table I below.

TABLE I

| Resin | Properties of the Resins | | | | | |
|---|---|---|---|---|---|---|
| | 1 | 2 | 3 | 4 | 5 | 6 |
| Molecular weight (GPC) | | | | | | |
| Number average | 1507 | 833 | 1954 | 1367 | 1565 | 1693 |
| Weight average | 9380 | 3484 | 7664 | 8617 | 6055 | 5525 |
| ICI viscosity at 150° C. | 15 | 4 | 11 | 15 | 30 | 33 |
| tg, °C. | 14 | 18 | 21 | 9 | 25 | 27 |

Preparation of Enamels

Resins 1-6 can be dissolved in a solvent mixture (e.g., xylene/MAK/EEP/n-BuOH or MAK/EEP/n-BuOH) and formulated into industrial baking enamels as described in the following:

Example 7 - Preparation of Clear Enamels

The resin (20 g) was dissolved in 25-40 ml of a solvent mixture (55% xylene, 32% MAK (methyl n-amyl ketone), 6.5% EEP (ethyl 3 ethoxypropionate), and 6.5% BuOH by weight). To this solution were added a cross-linker, hexamethoxymethyl melamine (HMMM, Cymel 303, 8 g), an acid catalyst (20% p toluenesulfonic acid in i-PrOH, 0.3-0.5 g) and a fluorocarbon flow control additive (20% Fluorad FC 430 in i PrOH, 0.3 g). The mixture was stirred in a Waring blender for 5 min. A clear enamel was obtained. (Resin:HMMM/-about 70:30)

Example 8 - Preparation of White Enamels

White enamels were prepared similarly as described in Example 8 by adding $TiO_2$ (Du Pont R 900) white pigment in a resin:$TiO_2$/1:1 ratio by weight.

Coating Testings

The enamels can be applied to cold rolled steel test panels and baked at 160° C. for 1 hr. The coating testings were carried out according to the following standard methods:

1. Film Thickness (Fisher Deltascope ® MP2)
2. Film Hardness (Pencil Method, ASTM D3363)
3. Impact Resistance (BYK Gardner Impact Tester, ASTM D2794)
4. Flexibility (Conical Mandrel Test, ASTM D522)
5. Adhesion (Cross Cut Tape Test, ASTM D3359)
6. Solvent Resistance (ASTM Method D1308)
7. Cleveland Humidity (ASTM Method D2247)
8. Gloss (ASTM Method D523)

The white coating properties are shown in Table II. The coatings were usually cured at 150°-160° C. for 0.5-1 hr. The film thickness was normally 1 mil. The coatings generally showed the pencil hardness of 4H-6H, which varied on the film thickness, the amount of PTSA catalyst used, and curing conditions. The impact resistances were rather consistent, they all passed 160 in-lb both on direct and reverse impacts. The coatings were highly solvent resistant, they were generally not affected after 500 MEK double rubs. The coatings showed no blistering and little gloss loss after 30 days of Cleveland Humidity test at 60° C.

TABLE II

| Enamel | Properties of Coatings* | | | | | |
|---|---|---|---|---|---|---|
| | 1 | 2 | 3 | 4 | 5 | 6 |
| Film thickness, mil | 1 | 1 | 1 | 1 | 1 | 1 |
| Pencil hardness | 5H | 5H | 5H | 4H | 5-6H | 6H |
| Impact resistance | | | | | | |
| Direct, in-lb | 160 | 160 | 160 | 160 | 160 | 160 |
| Reverse, in-lb | 160 | 160 | 160 | 160 | 160 | 160 |
| Flexibility | 100% | 100% | 100% | 100% | 100% | 100% |
| Ahesion | 5B | 5B | 5B | 5B | 5B | 5B |
| Solvent resistance (MEK doublt-rub) | >500 | >500 | >500 | >500 | >500 | >500 |
| Cleveland humidity (30 days at 60° C.) | no | no | no | no | no | no |
| | (No: no blistering) | | | | | |
| Gloss, % at 60° | 97 | 95 | 95 | 98 | 97 | 98 |
| Gloss, % at 20° | 80 | 77 | 78 | 80 | 78 | 80 |

*The coatings were cured at 160° C. for 1 hr.

In order to further illustrate the superior properties of the coatings of the present invention, three control resins as well as two phenolic-functional resins (resin 7 and resin 8) were synthesized and coatings obtained. Various tests were performed on the coating panels to contrast the coating properties, such as gloss, pencil hardness, impact resistance, solvent resistance, humidity resistance, acid resistance, stain resistance, detergent resistance, and weatherability.

The phenolic functional resins may be prepared by introducing all the reactants, neopentyl glycol (NPG), 1,1,1-trimethylol propane (TMP), adipic acid (AD), terephthalic acid (TPA), and methyl 4-hydroxybenzoate (MHB), together in a one step reaction as described in the previous examples and in Example 9, or by introducing adipic acid in the second stage after other reactants have been reacted. The latter method is especially suitable for preparing resins with higher mole-ratio of TPA. By this method the reaction mixture becomes clear faster and the resulting resins usually have higher molecular weight and higher $t_g$. The two-stage method is described in Example 10.

Example 9 - Preparation of Resin 7

To a three neck round bottom flask equipped with a mechanical stirrer, a steam partial condenser, a Dean-Stark trap and a water condenser were charged the following reactants: NPG 202.98 g (1.95 mole), TMP 45.42 g (0.34 mole), AD 122.58 g (0.84 mole), TPA 199.20 g (1.20 mole), MHB 121.68 g (0.80 mole), and the catalyst, Fascat 4100 0.5 g. The mixture was heated to 150° C. and stirred under $N_2$ atmosphere. The temperature was then gradually increased to 220° C. in a period of 2 hr and the distillate (clear water and methanol) was collected in the Dean Stark trap. After stirring for 13 more hours, the resulting viscous resin was collected in a metal container and cooled to rt.

Example 10 - Preparation of Resin 8

To a three neck round bottom flask equipped with a mechanical stirrer, a steam partial condenser, a Dean-Stark trap and a water condenser were charged the following reactants: NPG 72.66 g (0.70 mole), TMP 15.14 g (0.11 mole), TPA 89.65 g (0.54 mole), MHB 40.57 g (0.27 mole), and the catalyst, Fascat 4100 0.2 g. The mixture was heated to 150° C. and stirred under $N_2$ atmosphere. The temperature was then gradually increased to 220° C. in a period of two hours and the distillate (clear water and methanol) was collected in the Dean-Stark trap. When the collection of the distillate stopped (three more hours), indicating the first stage reaction was almost complete, AD 20.44 g (0.14 mole) was added. After stirring for three more hours, the resulting viscous resin was collected in a metal container and cooled to rt.

The control resins were synthesized similarly as in Example 9. The compositions of phenol functional resins and the controls are shown below:

Resin 7: NPG/TMP/AD/TPA/MHB (38.0/6.6/16.4/23.4/15.6 mole %)
Resin 8: NPG/TMP/AD/TPA/MHB (39.8/6.2/8.0/30.7/15.3 mole %)
Control 1: NPG/TMP/AD/IPA (48.1/5.3/23.3/23.3 mole %)
Control 2: NPG/TMP/AD/TPA (48.7/7.1/18.2/26.0 mole %)
Control 3: NPG/TMP/AD/TPA (47.0/7.4/9.4/36.2 mole %)

Resin 8 is obtained approximately by replacing half of the AD in resin 7 with TPA. Control 1 is a common high-solids resin as published in Eastman Chemical Company literature (Publication No. N-278, Resin HS-3-1N). Control 2 and control 3 have basically the same composition as resin 7 and resin 8 respectively except that MHB was not used. The properties of the resins are shown below in Table III.

TABLE III

| Resin | Properties of the Resins | | | | |
|---|---|---|---|---|---|
| | Resin 7 | Resin 8 | Control 1 | Control 2 | Control 3 |
| Acid Number | 5 | 2 | 5 | 3 | 3 |
| Phenolic Hydroxyl Number | 71 | 70 | — | — | — |
| Mn* | 1931 | 2267 | 3134 | 2235 | 3221 |
| Mw** | 8917 | 19296 | 12181 | 6820 | 19677 |
| tg,°C. | 13 | 34 | −8 | −1 | 28 |

*number average molecular weight
**weight average molecular weight

White enamels were prepared from the above resins as described in the following example.

Example 11 - Preparation of White Enamels

The resin (20 g) was dissolved in 30–40 ml of a solvent mixture (55% xylene, 32% MAK (methyl n-amyl ketone), 6.5% EEP (ethyl 3-ethoxypropionate, EKTA-PRO® brand EEP, Eastman Kodak Company), and 6.5% BuOH by weight). To this solution were added $TiO_2$ (Du Pont R-900, 20 g), the crosslinker, hexamethoxymethyl melamine (HMMM, Cymel 303, 8 g), the acid catalyst (40% p-toulenesulfonic acid in i-PrOH, 0.3–0.4 g) and the fluorocarbon flow control additive (20% Fluorad FC-430 in i PrOH, 0.3 g). The mixture was stirred in a Waring blender for 5 min. A white enamel was obtained. (Resin:HMMM/about 70:30)

The enamels were applied to cold rolled steel test panels and baked at 175° C. for 20 min. The film thickness was about 1.0–1.5 mil. The coating properties are shown below in Table IV. The coating testings were carried out according to the following standard methods:

1. Film Thickness (Fisher Deltascope® MP2)
2. Gloss (ASTM Method D523)
3. Film Hardness (Pencil Method, ASTM D3363)
4. Impact Resistance (BYK Gardner Impact Tester, ASTM D2794)
5. Solvent Resistance (ASTM Method D1308)
6. Cleveland Humidity (ASTM Method D2247)
7. UV Accelerated Weathering (ASTM G-53)
8. Detergent Resistance (ASTM D2248)

TABLE IV

| Resin | Coating Properties | | | | |
|---|---|---|---|---|---|
| | Resin 7 | Resin 8 | Control 1 | Control 2 | Control 3 |
| Gloss, 60°/20° | 98/81 | 99/86 | 92/70 | 93/71 | 91/75 |
| Pencil Hardness | 5H | 5-6H | 3H | 3H | 3H |
| Impact Resistance direct reverse (lb-in) | 160/160 | 160/160 | 160/160 | 160/160 | 160/160 |
| MEK Double Rub | >200 | >200 | >200 | >200 | >200 |
| Cleveland Humidity 800 hr at 60° C. | N | N | B | N | N |
| % gloss retention, 60/20° | 90/85 | 98/91 | 150/99 | 95/67 | — |
| Chemical Resistance 50% $H_2SO_4$, 24 hr | 2 | 1 | 6 | 3 | 3 |
| film in conc. $H_2SO_4$, time to decomposition | 2 hr | 3 hr | <5 min | <5 min | <5 min |
| 50% NaOH, 24hr | 1 | 1 | 1 | 1 | 1 |
| Stain Resistance Iodine, 30 min | 2 | 1 | 5 | 4 | 3 |
| QUV Weatherability % gloss retention, 60/20° | | | | | |
| 500 hr | 94/78 | 96/82 | 97/91 | 96/78 | — |
| 1000 hr | 41/16 | 63/36 | 93/80 | 86/66 | — |
| Detergent Resistance 7 days at | 4 | 2 | 6 | 6 | — |

TABLE IV-continued

| | | Coating Properties | | |
|---|---|---|---|---|
| Resin | Resin 7 | Resin 8 | Control 1 | Control 2 | Control 3 |
| 74° C. | | | | | |

1: no effect, 2: very slight effect, 3 slight effect, 4: moderate effect, 5: considerable effect, 6: severe effect
N: no blistering
B: blistering As illustrated in Table IV. The coatings derived from the phenol functional resins of the present invention showed much improved or comparable properties in all the categories except the 1000 hr QUV weatherability. The superior properties are best shown in gloss, hardness, acid resistance, stain resistance, and detergent resistance, which are all highly desired in the applications of industrial baking enamels. The most striking difference of the properties was observed in the acid resistance test; when a piece of free standing coating films, obtained by casting the enamels on glass slides, cured, and peeled off, was dipped into concentrated sulfuric acid, the control films decomposed almost immediately while the films of the present invention were stable for 2-3 hr. This distinct difference further demonstrated the superior characteristics of the coatings derived from the phenol-functional resins of the present invention. An extraordinarily high gloss was also observed on the clear coating (without $TiO_2$ pigment) of resin 8. It had a 60°/20° gloss of 105/99. It should be noted the enamel of control 3 became too thick to be applied on the panels after sitting for 3 days, while others were stable for several months.

Example 12 showed that a phenolic functional resin with the same mole ratio of resin 8 could also be prepared by replacing MHB in Example 11 with the lower-cost raw material, PHBA.

Example 12 - Preparation of Resin 9

To a three neck round bottom flask equipped with a mechanical stirrer, a steam partial condenser, a Dean-Stark trap and a water condenser were charged the following reactants: NPG 72.66 g (0.70 mole), TMP 15.14 g (0.11 mole), TPA 89.65 g (0.54 mole), PHBA 36.83 g (0.27 mole), and the catalyst, Fascat 4100 0.2 g. The mixture was heated to 150° C. and stirred under $N_2$ atmosphere. The temperature was then gradually increased to 220° C. in a period of two hours and the distillate was collected in the Dean-Stark trap. When the collection of the distillate stopped (4.5 more hours), indicating the first stage reaction was almost complete, AD 20.44 g (0.14 mole) was added. After stirring for 3.5 more hours, the resulting viscous resin was collected in a metal container and cooled to rt.

The reaction time above was longer than that of Example 11 due to the lower solubility of PHBA in the reaction mixture; an organic layer (0.5-1 ml) was also observed in the distillate. To increase the solubility of PHBA, dimethyl terephthalate (DMT) was substituted for TPA as described in Example 13.

Example 13 - Preparation of Resin 10

To a three neck round bottom flask equipped with a mechanical stirrer, a steam partial condenser, a Dean-Stark trap and a water condenser were charged the following reactants: NPG 72.66 g (0.70 mole), TMP 15.14 g (0.11 mole), DMT 104.77 g (0.54 mole), PHBA 36.83 g (0.27 mole), and the catalyst, Fascat 4100 0.2 g. The mixture was heated to 175° C. and stirred under $N_2$ atmosphere; it became clear in 10 min. The temperature was then gradually increased to 220° C. in a period of two hours and the distillate (clear water and methanol) was collected in the Dean Stark trap. When the collection of the distillate stopped (2.5 more hours), indicating the first stage reaction was almost complete, AD 20.44 g (0.14 mole) was added. After stirring for two more hours, the resulting viscous resin was collected in a metal container and cooled to rt.

As indicated in the above example, the reaction mixture was a clear homogeneous solution when DMT was used. As a result, the reaction time was shorter than those required for the reactions in previous examples.

Isophthalic acid (IPA), a meta oriented compound, was known to be capable of providing kinks into rigid polymer chains to reduce melting point and increase solubility. Accordingly, IPA was substituted for half of the TPA in example 13 to increase resin solubility and enamel stability. The reaction is described in Example 14.

Example 14 - Preparation of Resin 11

To a three-neck round bottom flask equipped with a mechanical stirrer, a steam partial condenser, a Dean-Stark trap and a water condenser were charged the following reactants: NPG 72.66 g (0.70 mole), TMP 15.14 g (0.11 mole), TPA 44,83 g (0.27 mole), IPA 44,83 g (0.27 mole), PHBA 36.83 g (0.27 mole), and the catalyst, Fascat 4100 0.2 g. The mixture was heated to 150° C. and stirred under $N_2$ atmosphere. The temperature was then gradually increased to 220° C. in a period of two hours and the distillate was collected in the Dean Stark trap. When the collection of the distillate stopped (4.5 more hours), indicating the first stage reaction was almost complete, AD 20.44 g (0.14 mole) was added. After stirring for 2 more hours, the resulting viscous resin was collected in a metal container and cooled to rt.

The properties of resins 9, 10, and 11 are shown below in Table V.

Enamels and coatings were also prepared as described previously. No significant difference of the coating properties were observed among resin 8, 9, 10, and 11.

TABLE V

| | Properties of the Resins | | |
|---|---|---|---|
| Resin | Resin 9 | Resin 10 | Resin 11 |
| Acid Number | 0 | 3 | 9 |
| Phenolic Hydroxyl Number | 67 | 69 | 71 |
| Mn* | 2559 | 1903 | 1842 |
| Mw** | 11241 | 6159 | 7747 |
| tg, °C. | 45 | 32 | 39 |

*number average molecular weight
**weight average molecular weight

In Example 15 below, PHBA was reacted with an excess of TMP in the first stage of the reaction so that the monofunctional nature of PHBA would not terminate the polymer chains. As a result resin 12 had higher molecular weight (i.e., Mn=3200, Mw=66,000). In addition, the reaction time was found to be shorter. The resulting resin was yellowish in color, but when a color stabilizer (WESTON 618, Borg-Warner Chemicals., Inc., 0.2 g) was added to the reaction mixture, the resulting resin was almost colorless.

Example 15. Preparation of Resin 12

To a three-neck round bottom flask equipped with a mechanical stirrer, a steam partial-condenser, a Dean-Stark trap, and a water condenser were charged the following reactants: TMP 30.28 g (0.23 mole), PHBA 36.83 g (0.27 mole), and the catalyst, FASCAT 4100 (0.2 g). The mixture was heated to 150° C. and stirred under $N_2$ atmosphere. The temperature was then gradually increased to 220° C. over a period of 0.5 hour and the distillate was collected in the Dean Stark trap. When the collection of the distillate stopped (one additional hour), indicating the first stage reaction was almost complete, NPG 55.50 g (0.53 mole) and TPA 89.65 g (0.54 mole) were then added. After stirring for four more hours, AD 20.44 g (0.14 mole) was added. The reaction was complete after stirring for one more hour. The resulting viscous resin was collected in a metal container and cooled to room temperature.

Water-Borne Enamel Compositions

Water Borne polyester coatings are highly desirable to enable compliance with governmental solvent emission regulations directed to lowering the environmental impact of solvent evaporation during coating application. Toward this objective, water borne enamels were prepared by a conventional amine neutralization method. (See Olding and Hayward, Ed., "Resins for Surface Coatings", Volume III, SITA Technology, London, 1987, p. 182). The phenolic functional resins prepared previously may be reacted with a polybasic acid such as trimellitic anhydride (TMA), phthalic anhydride, trimellitic acid, citric acid, and the like, to yield a resin with an acid number of about 40–70 which can then be neutralized with an amine such as N,N-dimethylaminoethanol (DMAE), triethyl amine, or ammonium hydroxide. As for the resins having an acid number higher than 40, they can be neutralized directly with an amine. The resulting resin with hydrophilic ammonium salt end groups can then be dispersed in water to produce water-borne enamels. The coatings can also be prepared as described previously.

Example 16 - Preparation of Water-Borne Enamel Composition

Resin 9 (40 g) was heated to 180° C. and stirred in a round-bottom flask equipped with a water condenser. Trimellitic anhydride (1 g) was then added to the above resin and stirred for 30 minutes. After the mixture was cooled to 80° C., a co solvent, ethylene glycol monobutyl ether (10 g) was added, followed by DMAE (1.5 g). The resulting viscous solution was then dispersed in distilled water (60 g) at 50° C. The water dispersion was subsequently transferred to a blender and mixed with CYMEL 303 (16 g), $TiO_2$ (40 g), and FLOURAD FC 430 (20% in isopropanol, 0.6 g) to yield a water borne white enamel.

I claim:

1. An enamel composition which when applied to a substrate and cured provides a coating having a pencil hardness of greater than 4H, an impact resistance of greater than 140 lb. in., and being substantially resistant to acidic corrosion, said composition comprising (I) about 25 to about 65 weight percent of a curable polyester having a number average molecular weight of about 800 to about 3500 and a weight average molecular weight of about 3000 to about 70,000, comprising (a) about 35 to 45 mole percent of diol residues, based on the total moles of (a), (b), (c), (d), (e), and (f);

(b) about 4 to about 8 mole percent of triol residues, based on the total moles of (a), (b), (c), (d), (e), and (f);

(c) about 5 to about 18 mole percent, based on the total moles of (a), (b), (c), (d), (e), and (f), of residues of an aliphatic diacid (d) about 0 to about 30 mole percent of aromatic dicarboxylic acid residues based on the total moles of (a), (b), (c), (d), (e), and (f);

(e) about 5 to about 35 mole percent of terephthalic acid residues based on the total moles of (a), (b), (c), (d), (e), and (f);

(f) about 12 to about 20 mole percent, based on the total moles of (a), (b), (c), (d) (e), and (f) of hydroxy acid residues selected from residues of

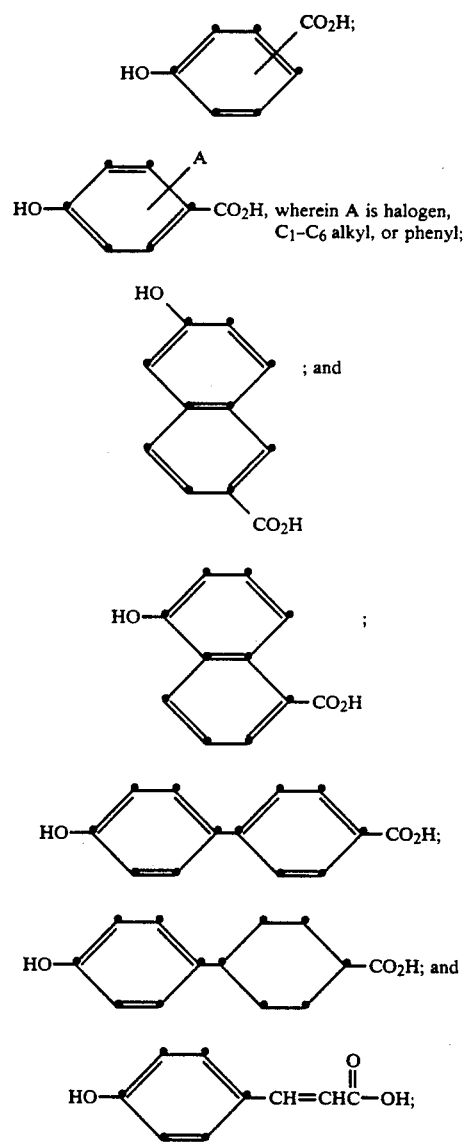

wherein substantially all of said hydroxy acid residues are at the ends of said curable polyester;

(II) about 5 to about 20 weight percent of an amino crosslinking agent; based on the total weight of (I), (II), and (III);

(III) about 30 to about 70 weight percent of an organic solvent, based on the total weight of (I), (II), and (III), the total being 100 percent.

2. The enamel composition of claim 1, wherein component (a) diol residues are selected from residues of

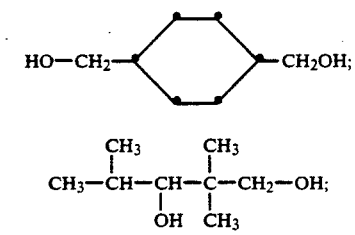

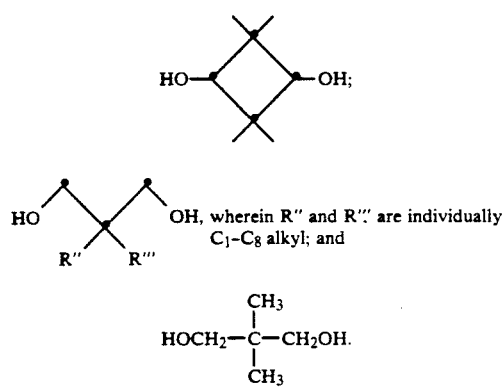

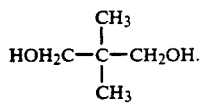

HO—CH₂—⬡—CH₂OH;

CH₃—CH—CH—C—CH₂—OH;
      |    |   |
      OH   CH₃ CH₃
           CH₃

HO—◇—OH;

HO—C(R")(R"')—OH, wherein R" and R"' are individually C₁–C₈ alkyl; and

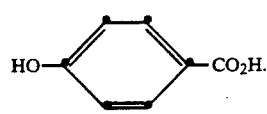

HOCH₂—C(CH₃)₂—CH₂OH.

3. The enamel composition of claim 1, wherein component (b) triol residues are selected from residues of trimethylolpropane, trimethylolethane, and glycerol.

4. The enamel composition of claim 1 wherein the component (a) diol residue is comprised of a residue of the formula

HOH₂C—C(CH₃)₂—CH₂OH.

5. The enamel composition of claim 1, wherein the component (b) triol residue consists essentially of trimethylolpropane residues.

6. The enamel composition of claim 1, wherein the component (f) hydroxy acid residue is a residue of the formula

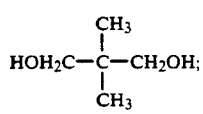

HO—⬡—CO₂H.

7. The enamel composition of claim 6, wherein the component (a) diol residues are comprised of a residue of the formula

HOH₂C—C(CH₃)₂—CH₂OH;

component (b) triol residues are comprised of trimethylolpropane residues;

component (c) aliphatic diacid residues are comprised of adipic acid residues;

component (d) aromatic diacid residues are comprised of isophthalic acid residues; and component (f) hydroxy acid residues are comprised of residues of

HO—⬡—CO₂H.

8. A shaped or formed article coated with the cured enamel composition of claim 1.

9. An auto body or body part coated with the cured enamel composition of claim 1.

10. The curable enamel composition of claim 1 further comprising one or more leveling, rheology, and flow control agents; flatting agents; pigment wetting and dispersing agents and surfactants; ultraviolet absorbers; ultraviolet light stabilizers; tinting pigments; defoaming and anti-foaming agents; anti-settling, anti-sag and bodying agents; anti-skinning agents; anti-flooding and anti-floating agents; fungicides and mildewicides; corrosion inhibitors; thickening agents; or coalescing agents.

11. The composition of claim 1, further comprising one or more pigments.

12. An enamel composition which when applied to a substrate and cured provides a coating having a pencil hardness of greater than 4H, an impact resistance of greater than 140 lb. in., and being substantially resistant to acidic corrosion, said composition comprising (I) about 25 to about 65 weight percent of a curable polyester having a number average molecular weight of about 800 to about 3500 and a weight average molecular weight of about 3000 to about 70,000, comprising (a) about 38 to 42 mole percent of diol residues, based on the total moles of (a), (b), (c), (d), and (e);

(b) about 5 to about 7 mole percent of triol residues, based on the total moles of (a), (b), (c), (d), and (e);

(c) about 6 to about 10 mole percent, based on the total moles of (a), (b), (c), (d), and (e) of an aliphatic diacid;

(d) about 28 to about 32 mole percent of terephthalic acid residues based on the total moles of (a), (b), (c), (d), and (e);

(e) about 14 to about 16 mole percent, based on the total moles of (a), (b), (c), (d) and (e), of a hydroxy acid residue of the formula

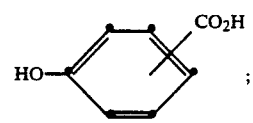

HO—⬡—CO₂H;

wherein substantially all of said hydroxy acid residues are at the ends of said curable polyester;

(II) about 5 to about 20 weight percent of an amino crosslinking agent; based on the total weight of (I), (II), and (III);

(III) about 30 to about 70 weight percent of an organic solvent, based on the total weight of (I), (II), and (III), the total being 100 percent.

13. The enamel composition of claim 12, wherein the triol residues consist essentially of trimethylolpropane residues.

14. The enamel composition of claim 13, wherein the aliphatic diacid is adipic acid.

15. The enamel composition of claim 12, wherein the hydroxy acid residue is residues of p-hydroxy benzoic acid.

16. An enamel composition which when applied to a substrate and cured provides a coating having a pencil hardness of greater than 4H, an impact resistance of greater than 140 lb. in., and being substantially resistant to acidic corrosion, said composition comprising
(I) about 25 to about 65 weight percent of a curable polyester having a number average molecular weight of about 800 to about 3500 and a weight average molecular weight of about 3000 to about 70,000, comprising
  (a) about 38 to 42 mole percent of diol residues, based on the total moles of (a), (b), (c), (d), (e), and (f);
  (b) about 5 to about 7 mole percent of triol residues, based on the total moles of (a), (b), (c), (d), (e), and (f);
  (c) about 6 to about 10 mole percent, based on the total moles of (a), (b), (c), (d), (e), and (f), of an aliphatic diacid;
  (d) about 13 to about 17 mole percent of aromatic dicarboxylic acid residues, based on the total moles of (a), (b), (c), (d), (e), and (f);
  (e) about 13 to about 12 mole percent of terephthalic acid residues based on the total moles of (a), (b), (c), (d), (e), and (f);
  (f) about 14 to about 16 mole percent, based on the total moles of (a), (b), (c), (d) (e), and (f), of a hydroxy acid residue of the formula

wherein substantially all of said hydroxy acid residues are at the ends of said curable polyester;
(II) about 5 to about 20 weight percent of an amino crosslinking agent; based on the total weight of (I), (II), and (III);
(III) about 30 to about 70 weight percent of an organic solvent, based on the total weight of (I), (II), and (III), the total being 100 percent.

17. The enamel composition of claim 16, wherein the triol residues consist essentially of trimethylolpropane residues.

18. The enamel composition of claim 17, wherein the aliphatic diacid is adipic acid and the aromatic acid is isophthalic acid.

19. The enamel composition of claim 16, wherein the hydroxy acid residue is the residue of p-hydroxy benzoic acid.

20. A water borne enamel composition which comprises
(I) about 25 to about 65 weight percent of a curable polyester having a number average molecular weight of about 800 to about 3500 and a weight average molecular weight of about 3000 to about 70,000, comprising
  (a) about 35 to 45 mole percent of diol residues, based on the total moles of (a), (b), (c), (d), (e) and (f);
  (b) about 4 to about 8 mole percent of triol residues, based on the total moles of (a), (b), (c), (d), (e), and (f);
  (c) about 5 to about 20 mole percent, based on the total moles of (a), (b), (c), (d), (e), and (f) of residues of an aliphatic diacid.
  (d) about 0 to about 30 mole percent of aromatic dicarboxylic acid residues based on the total moles of (a), (b), (c), (d), (e), and (f);
  (e) about 5 to about 35 mole percent of terephthalic acid residues based on the total moles of (a), (b), (c), (d), (e), and (f);
  (f) about 12 to about 17 mole percent, based on the total moles of (a), (b), (c), (d), (e), and (f) of hydroxy acid residues selected from residues of

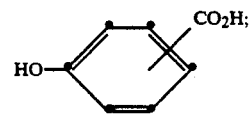

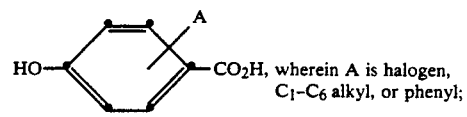
wherein A is halogen, $C_1$-$C_6$ alkyl, or phenyl;

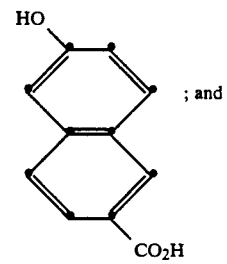
; and

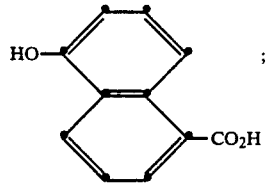

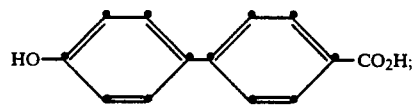

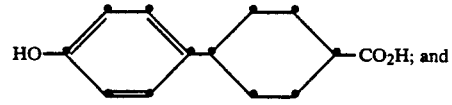
; and

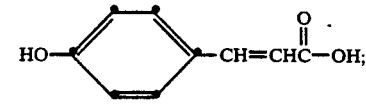

wherein substantially all of said hydroxy acid residues are at the ends of said curable polyester; wherein said curable polyester, if having an acid number of 40 or less, is modified by treatment with a polybasic acid to yield a modified curable polyester having an acid number of about 40 to 70, followed by treatment of the curable polyester or modified polyester with about 1 to about 4 weight percent of an amine;

(II) about 5 to about 20 weight percent of an amino crosslinking agent;

(III) about 0 to about 10 weight percent of a water-miscible organic solvent; and (IV) about 30 to about 70 weight percent of water.

21. The water-borne enamel composition of claim 20, wherein component (a) diol residues are selected from resides of

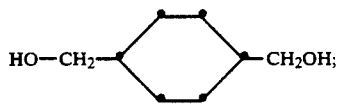

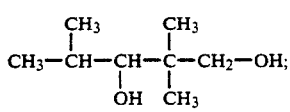

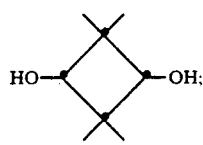

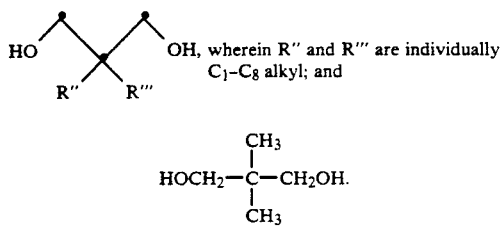

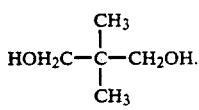

22. The water-borne enamel composition of claim 20, wherein component (b) triol residues are selected from residues of trimethylolpropane, trimethylolethane, and glycerol.

23. The water-borne enamel composition of claim 20 wherein the component (a) diol residue is comprised of a residue of the formula $$HOH_2C-\underset{\underset{CH_3}{|}}{\overset{\overset{CH_3}{|}}{C}}-CH_2OH.$$

24. The water-borne enamel composition of claim 20, wherein the component (b) triol residue consists essentially of trimethylolpropane residues.

25. The water-borne enamel composition of claim 20, wherein the component (e) hydroxy acid residue is a residue of the formula

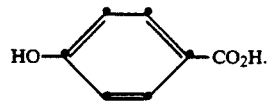

26. The water-borne enamel composition of claim 20 wherein the component (a) diol residues are comprised of a residue of the formula

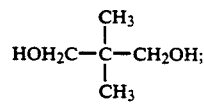

component (b) triol residues are comprised of trimethylolpropane residues;

component (c) aliphatic diacid residues are comprised of adipic acid residues;

component (d) aromatic diacid residues are comprised of isophthalic acid residues; and component (f) hydroxy acid residues are comprised of residues of

27. A shaped or formed article coated with the cured enamel composition of claim 20.

28. An auto body or body part coated with the cured enamel composition of claim 20.

29. The water-borne enamel composition of claim 20 further comprising one or more leveling, rheology, and flow control agents; flatting agents; pigment wetting and dispersing agents and surfactants; ultraviolet absorbers; ultraviolet light stabilizers; tinting pigments; defoaming and anti-foaming agents; anti-settling, anti-sag and bodying agents; anti-skinning agents; anti-flooding and anti-floating agents; fungicides and mildewicides; corrosion inhibitors; thickening agents; or coalescing agents.

30. The water-borne enamel composition of claim 20, further comprising one or more pigments.

* * * * *